Figure 1:
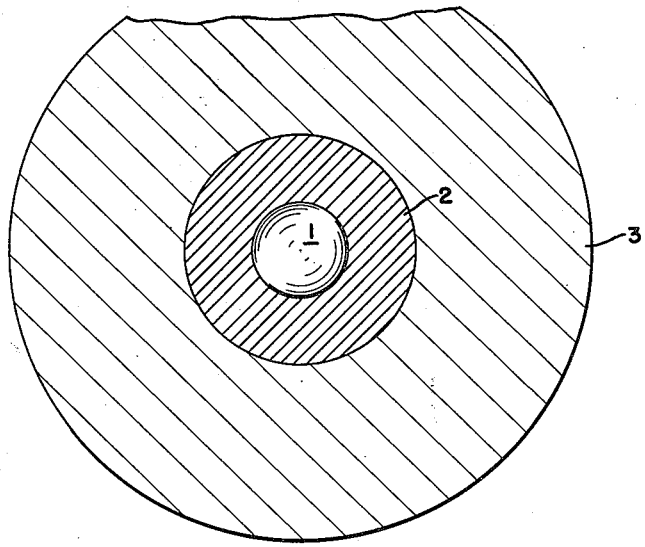

INVENTORS
ANTHONY STATHOPLOS
LAWRENCE A. WILLS
BY
ATTORNEYS

3,108,052
NUCLEAR REACTOR SHIELD
Anthony Stathoplos, White Plains, and Lawrence A. Wills, Hastings on Hudson, N.Y., assignors, by mesne assignments, to United Nuclear Corporation, New York, N.Y., a corporation of Delaware
Filed Nov. 3, 1955, Ser. No. 544,671
2 Claims. (Cl. 204—193.2)

This invention relates to nuclear reactors and more particularly to the construction of radiation shields for nuclear reactors by which may be produced a reactor and shield assembly of low weight.

Even though the energy-producing core of a nuclear reactor may be made relatively small and light, the total weight of any reactor and shield assembly constructed according to presently known principles is extremely large. The main part of this weight resides in the shield which is necessary to prevent injury to persons and contamination of equipment in the vicinity of the reactor. Because of this, many very desirable applications of nuclear power reactors have been, until now, difficult or impossible.

It has long been appreciated that a substantial reduction in the weight of reactor shields without appreciable reduction is shielding effectiveness could make vehicles, particularly commercial types, independent of conventional fueling facilities and that their power requirements could be met with physically smaller and lighter plants, thus permitting increased payload. In the alternative, power outputs could be greatly increased and operating ranges could be extended by substantial amounts through replacement of conventional engines with nuclear energy power plants. Vehicles of all types could be made to do their work with increased economy. Moreover, inexpensive, lightweight power plants easily transportable to remote areas could be constructed to supply energy for industry of all kinds. Despite these benefits, commercial mobile applications of nuclear reactors have not been possible because of the great mass of the indispensable radiation shields constructed according to presently known principles.

It is well known that the harmful radiations emanating from a nuclear reactor consist mainly of neutrons and gamma rays. To protect personnel and instruments in the neighborhood of a reactor from severe injury, both of these radiations must be greatly attenuated after they escape the reactor itself.

High energy neutrons may best be eliminated by first reducing their velocity through the mechanism of elastic collisions with nuclei of low atomic mass and then absorbing them in a suitable material. Since hydrogen is the lightest element, it possesses the most efficient nucleus for slowing-down fast neutrons.

On the other hand, gamma radiation may be best attenuated by interposing in its path matter of high density, and preferably, although not necessarily, of high atomic mass. Thus, a radiation shield for a nuclear reactor must comprise a material of low atomic mass for the reduction of neutron flux and a material of high density for the reduction of gamma radiation. Because the thickness of a gamma shield necessary to effect a given degree of attenuation is relatively constant and independent of the distance from the source of the radiation, elementary geometrical considerations make it obvious that, to minimize the weight of a closed shield, the dense material of the gamma shield should be placed as close as possible to the reactor core, and that the less dense material of the neutron shield is best located outside the gamma shield. For example, if the required thicknesses of the gamma and neutron shields were each one foot, and the reactor core were a one-foot diameter sphere, approximately a threefold saving in weight could be achieved by placing the gamma shield adjacent to the core, as compared with placing it one foot from the surface of the core.

Although the savings in weight and expensive shielding material obtainable by this arrangement have long been known, reactor designers have always deemed it impossible of achievment for three principal reasons:

(a) If the gamma shield is located within the neutron shield, then the neutrons emitted from the reactor must traverse the gamma shield. A portion of these neutrons is captured by the heavy nuclei of the gamma shield. This results in the formation of still heavier nuclei which stabilize themselves by the emission of additional gamma rays. Some of this secondary gamma radiation will be produced near the outer periphery of the gamma shield and will escape substantially unattenuated through the neutron shield.

(b) In its passage through the heavy matter of the gamma shield, a portion of the higher energy neutrons will undergo inelastic scattering. In this process, a neutron is captured by a nucleus of the shield material. This forms a compound nucleus which stabilizes by emitting a neutron of lower kinetic energy together with a gamma ray. Gamma radiation created by this process in the outer regions of the gamma shield will also escape through the light neutron shield.

(c) When a light weight neutron shield composed of hydrogen or hydrogenous material is placed outside the dense gamma shield, the neutrons emitted from the reactor core are slowed-down by the hydrogen nuclei and may eventually be captured by them or may be diffused back into the gamma shield to be captured there. In either event, the capture of neutrons results in the emission of high energy gamma radiation which can be only slightly attenuated by the neutron shield placed outside the gamma shield.

For the reasons that have been given, reactor designers have always considered it necessary to place the dense gamma shield outside the light neutron shield or to mingle the light and heavy shield materials, thereby greatly increasing the weight of the shield. For example, in a well know recent book on nuclear engineering (Richard Stephenson, Introduction to Nuclear Engineering, McGraw-Hill Book Co., 1954, p. 208), the author states, "Furthermore, the problem of reactor shielding cannot be solved merely by using one layer of neutron absorber and one layer of gamma absorber. . . . The neutron and gamma absorber must be properly distributed throughout the shield, either as layers or as a fairly homogeneous mixture. . . ."

We have invented new combinations and arrangements of materials which, when associated according to principles to be stated, overcome the difficulties recited above and make possible the construction of a reactor and shield having a substantially lower gross weight than has heretofore been possible while maintaining a given degree of attenuation of neutron and gamma radiation. Attendant upon this reduction in mass of the reactor shield is a substantial reduction in cost and complication of construction.

According to our invention we construct a shield having a first layer of high density material adjacent the reactor core and a second layer of material of low atomic mass more remote from the core than the layer of high density. The material of the layer of high density comprises an element or combination of elements having low emission of gamma radiation due to inelastic scattering of neutrons which bombard the nuclei of the material. This material may be selected from the class of elements or compounds of elements characterized by low absorption cross sections for neutrons. Such a material will then have a low total emission of gamma radiation upon bombardment by neutrons.

In the alternative, we use a dense material comprising an element having a low gamma emission characteristic due to inelastic scattering but having a high absorption cross section. According to our invention, such a material may be made to have the equivalent of a low absorption cross section through its combination with a second material. This second material comprises an element selected from the class of elements having high probability of capturing neutrons, i.e. high absorption cross section, but which emits little or no gamma radiation.

According to our invention, a second layer of material having low atomic mass is positioned more remote from the reactor core than the first layer and is used to attenuate the energy of fast neutrons. The principal material of the second layer is hydrogen or a hydrogenous compound. Gamma emission due to capture (either in materials of the hydrogenous layer or in materials of the preceding high density layer) of the neutrons slowed down by the hydrogen may be virtually eliminated by combining with the principal material of the neutron shield another material which has a very high probability of capturing neutrons, and yet does not emit gamma radiation as a result of such capture. The material to be added is selected from the class of materials which, upon capturing neutrons, emit easily-absorbed charged particles.

It will be clear from the foregoing that we have invented means which obviate almost completely all objections to construction of a reactor having a shield with the major portion of the high density material for attenuating gamma radiation immediately adjacent the reactor core. The lower density neutron attenuating portion of the shield is then made to surround the high density material.

Figure 2:
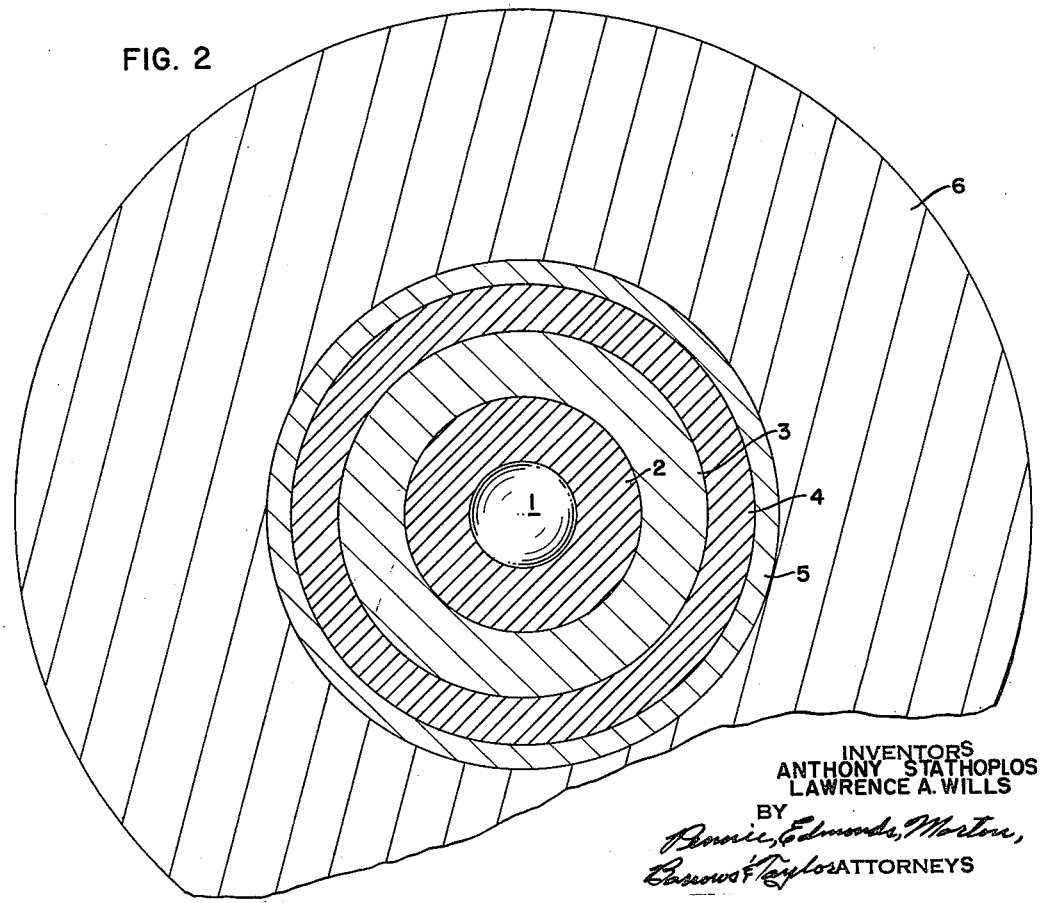

For a detailed description of reactor shields utilizing combinations and arrangements of materials which are illustrative of our invention, and to further point out the features of our invention, attention is directed to the following specification and the accompanying drawing of which:

FIG. 1 is a schematic representation of a reactor core and a radiation attenuating shield; and FIG. 2 is a schematic representation of a modification of the reactor and shield of FIG. 1.

Referring to FIG. 1 there is represented at 1 a reactor core. To realize the maximum advantages of reduced weight and cost of material obtainable from the present discovery the reactor core should be as compact as possible. This dictates that the shape of the core be spherical, although non-spherical shapes may be used where other considerations outweigh the purely geometrical one. The volume of a core having a specified thermal capacity may also be minimized by utilizing enriched fuel, that is, a fuel having a high proportion of fissionable material such as U-235. Moreover, the reactor coolant should be one having high density and high specific heat to insure efficient heat removal. Reactors having these characteristics are conventionally referred to as fast reactors; that is, reactors which utilize little or no neutron moderating or slowing down substances in the region of the core and in which the fission process utilizes neutrons having a median energy on the order of $10^5$ electron volts.

The gamma radiation attenuating portion of the shield is indicated at 2 and comprises a material having high density. Practically speaking, the material used here should have a density of at least 8 grams per cubic centimeter. Preferably, although not necessarily, the atomic nuclei of the material should have high atomic mass. According to one aspect of our invention we select from such materials any one having the property of low inelastic scattering when bombarded by neutrons. Elements possessing these properties are lead and bismuth, for example. An additional desirable property of these and other elements is a low absorption cross section for neutrons. Taken together, these properties are characteristic of material suitable for use in the inner and dense layer of our new reactor shield. Such materials have a low net gamma radiation emission when bombarded by neutrons and are also good absorbers of gamma radiation. While the latter fulfills the essential purpose of the inner layer of our shield, the material must also have the former property to minimize the production of gamma radiation due to neutron bombardment of the outer portion of the dense shield where there is little remaining material to absorb that radiation as it is propagated outwardly.

We have found that some materials having the desired low gamma radiation emission due to inelastic scattering do not have suitably low neutron absorption cross sections and that this apparently excluded the use of these materials in the inner layer of our new shield despite their good gamma radiation absorption properties. However, according to another aspect of our invention, we have found that such materials may be made to have the property of low net emission of gamma rays under neutron bombardment by combining them with a second material. We use for this purpose a material which, while it may or may not have the other desirable properties for gamma shielding of the first material, does have a high absorption cross section for neutrons and which does not emit high energy gamma radiation upon neutron capture. Lithium and boron and their compounds are examples of such material. Thus, the inner layer may consist of a high density material having the property of low inelastic scattering of neutrons, such as tungsten, in combination with lithium, which has a high absorption cross section but no gamma ray emission upon neutron capture. The combined materials will possess the desirable property of low net gamma emission under neutron bombardment.

To absorb or attenuate neutron radiation from the reactor we provide, in any suitable structural container, a shell 3 of material having low atomic mass. This shell surrounds the shell 2 and comprises hydrogen or a hydrogenous compound and an additive material which has a much higher probability than hydrogen for capture of thermal neutrons, but which emits little or no gamma radiation as a result of such capture. Boron and lithium meet the conditions for this additive material in the neutron absorbing shell as is shown by the following equations:

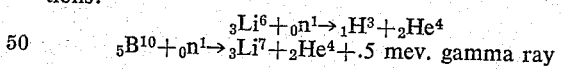

$$_3Li^6 + _0n^1 \rightarrow {_1H^3} + _2He^4$$
$$_5B^{10} + _0n^1 \rightarrow {_3Li^7} + _2He^4 + .5 \text{ mev. gamma ray}$$

Both materials have very high capture cross sections for neutrons. However, the .5 mev. gamma ray following the capture of a neutron in boron makes it a less desirable material than $Li^6$. A similar, though not equally desirable, material is helium 3 which emits mainly protons upon neutron capture. The additive material may consist of one or more of these elements or compounds containing one or more of these elements. Examples of such compounds are lithium and boron hydrides. The material may consist of a water solution of a compound of one or more of these elements.

The foregoing is a description of a simple reactor shield according to our invention. It is apparent that, where necessary, as in passenger carrying vehicles, a higher degree of attenuation may be obtained through the addition of more layers of high and low density materials. To this end we may use a second relatively thin layer or shell of the same kind of material as is used in the first layer of high density material. This layer is illustrated at 4 in FIG. 2. In the same manner, additional neutron shielding may be had by a layer of low density material as at 6. This material will be of the same general kind as specified for layer 3. Although a shield having more than two layers of alternately heavy and light materials will be somewhat heavier than a simple two layer shield, a substantial reduction in the weight of the shield will still be realized as compared with shields of equal effectiveness constructed according to conventional techniques.

We have also found that the generation of gamma radiation within the shield itself due to neutron return from the second and similar layers of material of low atomic density back into the first layer of material of high atomic density may be effectively reduced by providing, at or near an interface, between the high and low density materials, a layer or admixture of one of the previously described materials, such as lithium or boron or a compound thereof, having a relatively high neutron absorption cross section and low gamma radiation yield upon neutron capture. Such a layer is illustrated at 5 of FIG. 2. In the alternative, the added material may be mixed in with either the layer of heavy or light material of the gamma or neutron shielding portions, respectively. This aspect of our invention is effective to limit the generation of gamma radiation in the outer regions of the first or similar layers of high density material due to neutron flux back from the material of low density. This technique may be used in conjunction with any of the other combinations of layers of materials described above.

Solely for purposes of illustration of our invention, we offer the following specific examples.

*Example I*

A-fast-reactor core at 1 in FIG. 1 twelve inches in diameter, containing fuel enriched in uranium-235 and cooled by a flow of liquid metal, produces 10,000 kilowatts of heat. The core is surrounded by a radiation shield comprised, in order successively outward from the core, of a layer of lead 8.5 inches thick at 2 and a layer of lithium hydride 22 inches thick at 3. The lithium hydride is contained in a suitable tank. The shield weighs approximately 11,500 pounds and is effective to reduce radiation from the core to 163 roentgen equivalent man per hour (rem./hr.) at a distance of 50 feet from the shield. If the heavy layer were placed outside the light layer the weight would be 46,000 pounds.

*Example II*

A-fast-reactor core at 1 in FIG. 2 is 9 inches in diameter, containing fuel enriched in uranium-235 and cooled by a flow of liquid metal, and produces 5,000 kw. of heat. The core is surrounded by shield layers consisting, in order, of 5½ inches of bismuth at 2, 5½ inches of lithium hydride at 3, 4 inches of bismuth at 4, 2 inches of lithium hydride at 5 and 24 inches of borated water at 6. The calculated shield weight is 21,000 pounds.

This example gives a radiation dose of 6 rem./hr. at 50 feet, which is quite satisfactory for mobile applications where the operator occupies a shielded cab some distance from the reactor.

It is apparent from the foregoing description of particular embodiments of our invention that we have provided means for reducing the size and weight of nuclear reactor shields by very substantial amounts while preserving the high degree of effectiveness required. We accomplish this by a new combination and arrangement of materials for attenuating and absorbing the harmful radiations from a reactor, thereby eliminating the former objections to constructing reactor shields with the most dense material nearest the reactor. Although our invention is not limited to shields constructed as closed shells, it is obvious that the greatest weight reduction will be realized in shields of this kind. Of course, reactors in passenger carrying vehicles or mobile power plants must be completely shielded on all sides and it is in this area that our invention will be particularly useful.

We claim:

1. The combination comprising a nuclear reactor having a core of fissionable material and in which the fission process utilizes predominantly neutrons having a median energy on the order of $10^5$ electron volts and only one biological shield for said reactor immediately adjacent said core, which shield comprises only one gamma radiation attenuating layer and only one neutron attenuating and absorbing layer, said layers being constructed and arranged such that said gamma radiation attenuating layer is nearest the reactor to be shielded, said gamma radiation attenuating layer consisting essentially of a high density material having a density of at least 8 grams per cubic centimeter, and said neutron attenuating and absorbing layer consisting essentially of at least one material from the group consisting of hydrogen, deuterium, helium, lithium and boron.

2. The reactor and shield combination of claim 1 and in which said gamma radiation attenuating layer consists essentially of tungsten and having therein an admixture of a material having a high neutron absorption cross section and a low emission of gamma radiation upon absorption of neutrons.

References Cited in the file of this patent

UNITED STATES PATENTS

| 2,716,705 | Zinn | Aug. 30, 1955 |
| 2,727,996 | Rockwell et al. | Dec. 20, 1955 |
| 2,736,696 | Wigner et al. | Feb. 28, 1956 |
| 2,796,398 | Cruetz et al. | June 18, 1957 |
| 2,796,529 | Morrison | June 18, 1957 |
| 2,807,727 | Fermi et al. | Sept. 24, 1957 |

OTHER REFERENCES

Introduction to Nuclear Engineering, by Richard Stephenson, McGraw-Hill Book Co., N.Y. (1954), pp. 246–250.

Principles of Nuclear Reactor Engineering, by Samuel Glasstone, D. Van Nostrand Co., N.Y. (July 1955), pp. 576–589.

The Reactor Handbook, vol. I, Physics, AECD-3645, declassified edition February 1955, Atomic Energy Comm. Technical Information Service, pp. 715–716.

Glasstone: Principles of Nuclear Reactor Engineering, pages 803, 824 and 833.

Glasstone: Page 33.

Glasstone: Page 15.